June 19, 1951
C. VAN ASTEN
2,557,400
APPARATUS FOR PLAYING AN ORACLE CARD GAME
Filed Jan. 31, 1947
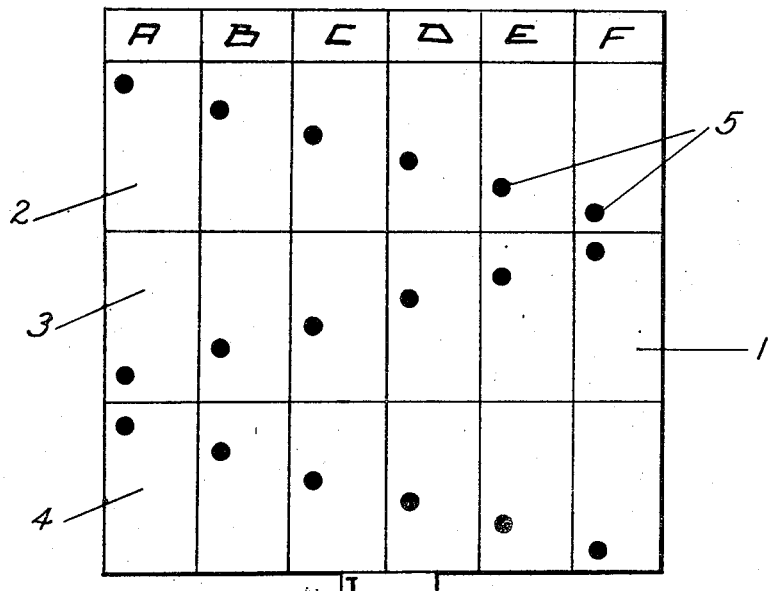
Fig 1.
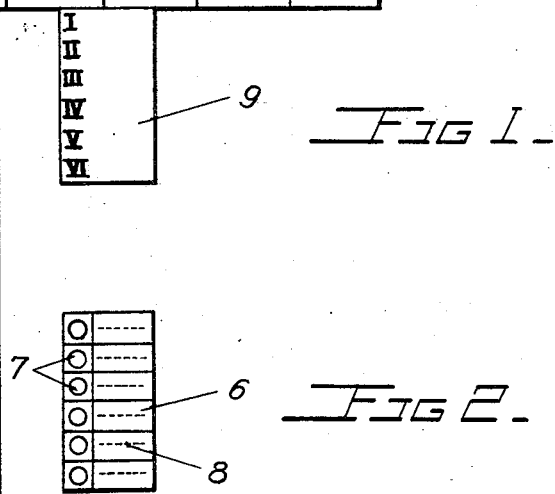
Fig 2.
Fig 3.
INVENTOR
CHRISTIAAN VAN ASTEN
BY Otto Munk
HIS ATT'Y Patented June 19, 1951

2,557,400

UNITED STATES PATENT OFFICE 2,557,400

APPARATUS FOR PLAYING AN ORACLE CARD GAME

Christiaan van Asten, The Hague, Netherlands

Application January 31, 1947, Serial No. 725,443
In the Netherlands June 18, 1945

Section 1, Public Law 690, August 8, 1946
Patent expires June 18, 1965

3 Claims. (Cl. 273—161)

This invention relates to an oracle game comprising a play board and a number of loose cards, which latter cards fit in fields indicated on the board, which board is provided with marks or signs indicating directions for the reading of sayings printed on the cards after the latter have been placed on the board. When playing the cards are first shuffled and are then distributed over the fields on the board, whereupon the reading of the sayings commences.

An oracle game of this kind has already been proposed. In this game, however, the number of the fields is rather limited (six of them) and each card is provided only with a limited number of sayings (4) which have always to be read together. In this way the number of the variations and possibilities is very limited. In another game that has been proposed a greater number of cards can be played together, but this game has again the complication that a rotary pointer is provided with the game. Moreover, each card can be provided with one saying only, so that the number of possibilities is again limited in this respect and it is not possible to divide the sayings in different zones which reduces the interest in the game.

The object of this invention is to improve a game of this kind. With this object in view according to the invention a sign is provided in each field of the board at a specific point of the field and each card is provided with a series of sayings which are arranged in the same subdivision corresponding to the different possible positions of the signs in the fields in such a manner that a sign in a field is always visible when a card is placed on the field in the prescribed manner and indicating a saying thereon, whilst the fields of the board are assembled together in groups and each group has an indication of a zone to which the sayings may refer.

Moreover according to the invention the board may comprise one or more additional fields provided at more than one of the possible positions of the signs with an indication having a definite meaning, for instance, indicating the meaning of all the sayings occurring on a card with respect to the days of the week.

One form of carrying the invention into effect is illustrated in the accompanying drawing, in which:

Figure 1 shows the play board in its simplest form,

Figure 2 shows a card belonging thereto of corresponding size, and

Figure 3 shows a similar card on an enlarged scale so that the writing thereon is readable.

The board 1 is sub-divided into six groups, each of three fields. The six groups are referred to as A, B, C, D, E, and F. The three fields of group A are indicated by 2, 3 and 4. The groups may refer to the following zones of sayings:

A. The house (of the player).
B. His path (through life).
C. His occupation.
D. Love.
E. Future.
F. Past.

A black dot 5 is indicated in each field in which six different positions are provided. For instance, this dot is provided in the first position in the field 2, in the sixth position (the last one) in field 3 and again in the first position in the field 4.

The cards 6 shown in Figure 2 fit pretty accurately in the fields of the board shown in Figure 1. They are provided along one edge with a series of six holes referred to by 7. If such a card is placed on any desired field of the board, the black dot 5 will become visible in the corresponding field through one of the holes 7. Behind each one of the said holes 7 there is provided a saying on the card (shown in the dotted lines 8 in Figure 2) whereof a sample is given in Figure 3. The saying is now read from behind the hole through which the dot 5 is visible and the same is associated with the zone of the corresponding group indicated by the letters AB/EF.

The extra field 9 has six signs which differ from one another and each one has a definite meaning. They are indicated by the Roman numerals in Figure 1. They may have, for instance, the following meaning:

I. Monday.
II. Tuesday.
III. Wednesday.
IV. Thursday.
V. Friday.
VI. Saturday.

When a card is placed on the extra field 9 these signs appear in all the holes of the card and each saying on the card receives then a meaning in connection with the corresponding signs.

What I claim is:

1. Apparatus for playing an oracle game comprising in combination a game board and a plurality of cards of the same size, the game board having a plurality of similar fields in its surface, said fields being equal in size and corresponding in shape and dimensions with the cards, each field carrying a sign at one of a definite number of places for such signs, the said places being arranged in a row equally positioned in each field, the cards each being provided with a definite number of sayings, said sayings corresponding in number and arrangement with the sign places in each field of the game board, the cards being further provided near each saying with a cut-out portion exactly coinciding in position with one of the sign places in a field, the fields on the game board surface being arranged together in groups, each group being clearly delimited and carrying an indication of a zone to which the saying on the cards may refer.

2. Apparatus for playing an oracle game as defined in claim 1, wherein each of said cards provided with said cut out portions has said cut out portions arranged in a similar series corresponding to the different possible sign places in the fields of said game board, said cut out portion being so positioned on said cards that a sign is always visible through one of said cut out portions when a card is placed correctly on a field, and wherein a saying is provided near each of said cut out portions on said cards.

3. Apparatus for playing an oracle game as defined in claim 1, wherein said game board is provided with at least one additional field, said additional field being equal in size and similar in shape and dimensions with said other fields on said game board, there being provided on said additional field at a plurality of possible sign places thereon an indication corresponding to certain days of the week, said indications being applicable to all of said sayings occurring on a card.

CHRISTIAAN van ASTEN.

REFERENCES CITED

The following references are of record in the file of this patent:

UNITED STATES PATENTS

| Number | Name | Date |
|---|---|---|
| 582,264 | Cadle | May 11, 1897 |
| 840,144 | Lincoln | Jan. 1, 1907 |
| 1,527,059 | Morgan | Feb. 17, 1925 |
| 2,234,341 | Goldnel | Mar. 11, 1941 |

FOREIGN PATENTS

| Number | Country | Date |
|---|---|---|
| 60,264 | The Netherlands | Nov. 15, 1947 |